(12) United States Patent
Eymard (10) Patent No.: US 8,947,507 B2
(45) Date of Patent: Feb. 3, 2015

(54) METHOD OF PROCESSING 3D IMAGES, AND CORRESPONDING SYSTEM INCLUDING THE FORMULATION OF MISSING PIXELS USING WINDOWS OF DETAILS FROM FIRST AND SECOND VIEWS

(75) Inventor: Frankie Eymard, Voiron (FR)

(73) Assignee: STMicroelectronics (Grenoble 2) SAS, Grenoble (FR)

(*) Notice: Subject to any disclaimer, the term of this patent is extended or adjusted under 35 U.S.C. 154(b) by 490 days.

(21) Appl. No.: 13/172,954

(22) Filed: Jun. 30, 2011

(65) Prior Publication Data

US 2012/0001904 A1    Jan. 5, 2012

(30) Foreign Application Priority Data

Jul. 1, 2010    (FR) .................................... 10 55325

(51) Int. Cl.
*H04N 13/02*    (2006.01)
*H04N 13/00*    (2006.01)

(52) U.S. Cl.
CPC ........ *H04N 13/0007* (2013.01); *H04N 13/0048* (2013.01)
USPC ...................................................... 348/46

(58) Field of Classification Search
CPC H04N 13/02; H04N 13/0048; H04N 13/0007
USPC ........................................................ 348/46
See application file for complete search history.

(56) References Cited

U.S. PATENT DOCUMENTS

| 6,055,012 A * | 4/2000 | Haskell et al. ................. 348/48 |
| 8,610,757 B2 * | 12/2013 | Cole et al. ....................... 348/42 |
| 2003/0223499 A1 * | 12/2003 | Routhier et al. ......... 375/240.25 |
| 2009/0128620 A1 * | 5/2009 | Lipton et al. .................... 348/42 |
| 2010/0073463 A1 | 3/2010 | Momonoi et al. .............. 348/47 |

(Continued)

FOREIGN PATENT DOCUMENTS

WO    2010/039417    4/2010    ............. H04N 13/00

OTHER PUBLICATIONS

Stereo/Multiview Video Encoding Using the MPEG Family of Standards, J. Ohm, Proc. SPIE vol. 3639 pp. 242-253.*

(Continued)

*Primary Examiner* — Jay Patel
*Assistant Examiner* — Francis G Geroleo
(74) *Attorney, Agent, or Firm* — Allen, Dyer, Doppelt, Milbrath & Gilchrist, P.A.

(57) ABSTRACT

The method is for processing a multiplex image, the multiplex including at least one first view intended to be viewed by a first eye of an observer and at least one second view intended to be viewed by a second eye of the observer. The two views are spatially sub-sampled according to complementary grids and mutually spatially shifted. The method includes a demultiplexing of the multiplex image so as to extract the first and the second views. And, for at least one missing pixel of the first view, there is a determination of a first window of the first view containing the location of the missing pixel and representing a first detail in the first view, a determination of a second window of the second view representing the same first detail in the second view, and a formulation of the missing pixel by using the pixels of the second window.

18 Claims, 7 Drawing Sheets

(56) References Cited

U.S. PATENT DOCUMENTS

| | | | |
|---|---|---|---|
| 2010/0171817 A1* | 7/2010 | Tourapis et al. | 348/51 |
| 2010/0188482 A1* | 7/2010 | Routhier et al. | 348/43 |
| 2010/0260268 A1* | 10/2010 | Cowan et al. | 375/240.25 |
| 2011/0254921 A1* | 10/2011 | Pahalawatta et al. | 348/43 |
| 2011/0280300 A1* | 11/2011 | Tourapis et al. | 375/240.2 |
| 2012/0114260 A1* | 5/2012 | Takahashi et al. | 382/238 |

OTHER PUBLICATIONS

Acquisition of Very High Resolution Images Using Stereo Cameras, SPIE vol. 1605, Nov. 1991, pp. 318-328.*

Aizawa et al., "Acquisition of very high resolution images using stereo cameras", SPIE, vol. 1605, Nov. 1991, pp. 318-328.

* cited by examiner

METHOD OF PROCESSING 3D IMAGES, AND CORRESPONDING SYSTEM INCLUDING THE FORMULATION OF MISSING PIXELS USING WINDOWS OF DETAILS FROM FIRST AND SECOND VIEWS

FIELD OF THE INVENTION

The present disclosure relates to image processing, in particular for improving resolution. The processed images are for example stereoscopic, auto-stereoscopic, 3D, three-dimensional or more generally images in which at least two views intended for each of the two eyes are multiplexed. The present disclosure applies advantageously but non-limitingly to image display devices and more generally to any image processing device.

BACKGROUND OF THE INVENTION

In the prior art there exists a directional or diagonal interpolation approach called Diagonal Correlated Deinterlacing (DCDi) which allows the resolution of a two-dimensional conventional image to be increased. According to this approach, several pairs of windows of the same size (for example 7*3 pixels) are selected in the neighborhood of a missing pixel. The pair exhibiting the best correlation is then selected so as to carry out a so-called diagonal interpolation computation making it possible to determine the value of the missing pixel.

This approach is not specifically adapted to 3D images which exhibit particular features with respect to conventional 2D images. Indeed, image formation able to simulate a perception of relief may require the multiplexing of two views, one for the right eye and the other for the left eye and these two views generally exhibit similarities.

To carry out this multiplexing there exist various 3D formats. Two categories of the latter may be distinguished, depending on whether the views for the right eye and the left eye are multiplexed in time (for example, the Frame Sequential format according to a term well known to the person skilled in the art) or in space (for example, the "line interleave" format according to a term well known to the person skilled in the art). In the latter case reference is made to spatial sub-sampling allowing each high-definition (HD) frame to contain an arrangement of the two views. For example, the two views are interleaved, they can also be side by side or top bottom. The resolution of each of the two multiplexed views is then halved.

It is also possible to multiplex more than one view for each of the eyes in the case, for example, of an auto-stereoscopic system offering several viewpoints, for example a multiplex can contain 8 views in a 4K frame (which includes four HD frames).

SUMMARY OF THE INVENTION

According to one mode of implementation and embodiment, there is provided a method and a device for image processing to utilize the particular features of the 3D images so as to increase their resolution.

According to another mode of implementation and embodiment, there is provided a method and a device for image processing which make it possible to amplify or reduce the perception of depth of a 3D image.

According to one aspect, there is provided a method for processing a multiplex image, the multiplex image comprising at least one first view intended to be viewed by a first eye of an observer and at least one second view intended to be viewed by a second eye of the observer, the two views being spatially sub-sampled according to complementary grids and mutually spatially shifted. The method comprising a demultiplexing of the multiplex so as to extract the first and the second view. And for at least one missing pixel of the first view: a determination of a first window of the first view containing the location of the missing pixel and representing a first detail in the first view; a determination of a second window of the second view representing the same first detail in the second view; and a formulation of the missing pixel by using the pixels of the second window.

Thus, provision is made to use the view intended for one eye to determine the missing pixel in the view intended for the other eye. More precisely the shift between the first and the second view is generally not constant for the whole of the view and may vary from one zone of the view to another. The determination of a second window containing the same detail of the view as that contained in the first view is therefore equivalent to determining the local shift (or parallax allowing the perception of depth) between the two views.

In this regard, windows having a size such that the local parallax is much the same for all the pixels contained in the windows may preferably be chosen. It may be possible to choose for example a rectangular window centered on the missing pixel and having a reduced size, for example, 7×3 pixels. Of course, the person skilled in the art may know to choose the shape and the size of the window so that the local parallax varies little inside the window.

The characteristics of the 3D images with spatial sub-sampling (which is detailed below) are thus taken into account to obtain an effective and particular algorithm. The characteristics of a 3D image relating to the fact that the first and the second view exhibit similarities are fully utilized to allow better-quality missing pixel formulation. Although it is possible to carry out the method steps only on a detail of the view, such steps may be generally advantageously repeated on the whole set of missing pixels of the first view so as to increase the resolution of the first view.

The determination of the second window for the formulation of the missing pixel can be performed in several ways. A first way envisages for example the use of computations of correlation between several shifted second candidate windows and the first window to determine the best second candidate window. A second way envisages the use of information about parallax contained in the incoming video stream. This parallax information relates for example to the pixels present in the first view or the pixels present and the pixels missing from the first view.

This second way may be used for example if in certain cases the first way does not allow the window to be obtained in a definite manner. That being noted, this second way may be used directly without previously using the first way.

Thus, according to one mode of implementation, the determination of the second window may comprise: a determination of several candidate windows within the second view, each second candidate window being included in a zone of chosen size of the second view, the zone containing the position of the missing pixel; computations of correlation between the first window and each second candidate window; and a selection of the second candidate window exhibiting the most significant correlation with the first window. Thus, it is simple to determine a window representing one and the same detail by using correlation computations.

According to another mode of implementation, the step of determining the second window may comprise: a reception of a stream comprising parallax information associated with the two views; and a selection of a second window included in a zone of chosen size of the second view, the zone containing the position of the missing pixel and whose shift with the first window is the closest to the parallax information of the missing pixel. This shift may be vertical and horizontal.

As indicated hereinabove, it is possible to use the stream comprising the parallax information independently of the use of the correlation and/or as a supplement to the correlation. Thus, the stream comprising parallax information may then be useful in two cases as follows: if several window candidates having a strong correlation with the window of the first view are determined; and if no better window candidate can be determined with the correlation computations. In these two cases the stream comprising parallax information makes it possible to select one and only one second window.

As indicated previously, according to one mode of implementation, the method steps may be repeated on all the missing pixels of the first view so as to increase the resolution of the first view. It is possible to carry out the same algorithm on the second view so as also to increase the resolution of this second view. But it may be simpler to formulate for example a missing pixel in the second window on the basis of the pixels of the first window associated therewith.

Thus in the case for example of an implementation in software form, or more generally in the case of an implementation in which access to large capacity memories is possible, the formulation of the missing pixel of the second window may be carried out just after the formulation of the missing pixel of the first window. Indeed, correlation being a commutative relation, if the second window exhibits the best correlation for the first window, the first window also exhibits the best correlation for the second window. It is therefore possible to use this first window to fill at least one missing pixel in the second window, for example by filling a missing pixel of the second window with a pixel having the same position, present in the first window.

According to another mode of implementation, the method further comprises a multiplexing of the two views with their increased resolution with regard to the shift information obtained on the basis of the pairs of first and second windows. Thus, after having retrieved a right view and a left view with their original resolution, a 3D image with an increased resolution is obtained by performing a multiplexing of these two views with their increased resolution. The multiplexing is carried out for example temporally in accordance with the "Frame Sequential" format, it can also be spatial or spatio-temporal.

According to one mode of implementation, the shift information obtained is multiplied by a coefficient before the multiplexing of the first and second view. It is thus possible to shift the pixels of the view intended for one eye with respect to the pixels of the view intended for another eye with a locally adapted shift value. Thus it is the depth perceived by the observer that is adapted. This depth corresponds to the distance between the object point perceived by the observer and the screen on which the observer's eyes focus. The adjustment is particularly relevant for a general-public application in which the distance between the screen and the observer may be small compared with the depth of the observed object (size of the lounge). Indeed, when the difference between the perceived object point and the point on which the eyes focus is significant compared with the screen observer distance, the observer may experience a sensation of annoyance combined with headaches. By virtue of this adapted depth, it is for example possible to reduce the distance between the object point and the point of focusing of the eyes.

According to another aspect, there is provided a system for processing a multiplex image, the multiplex comprising at least one first view intended to be viewed by a first eye of an observer and at least one second view intended to be viewed by a second eye of the observer, the two views being spatially sub-sampled according to complementary grids and mutually spatially shifted. The system comprising an input block or means for receiving the multiplex, and processing means comprising: a demultiplexing block or means configured to demultiplex the multiplex so as to extract the first and the second view; a first determination block or means configured to determine a first window of the first view containing the location of a missing pixel of the first view and representing a first detail in the first view; a second determination block or means configured to determine a second window of the second view representing the same first detail in the second view; a formulation block or means configured to formulate the missing pixel by using the pixels of the second window; and a control block or means able to activate the first and second determination means and the formulation means.

According to another embodiment, the second determination means may comprise: a preselection block or means for preselecting several second candidate windows within the second view, each second window being included in a zone of chosen size of the second view, the zone containing the position of the missing pixel; a computation block or means configured to perform computations of correlation between the first window and each second window; and a selection block or means configured to select from among the second candidate windows the second window exhibiting the most significant correlation with the first window.

According to another embodiment, the selection means are configured to select, on receipt of a stream comprising parallax information associated with the two views, a second window being included in a zone of chosen size of the second view, the zone containing the position of the missing pixel and whose shift with the first window is the closest to the parallax information of the missing pixel.

According to another embodiment, the control means are able to activate the first and second determination means and the formulation means for each of the missing pixels of the first view. According to another embodiment, the formulation means are configured to formulate a missing pixel in the second window on the basis of the first window associated therewith. According to another embodiment, the processing means furthermore comprise multiplexing means configured to multiplex the two views with their increased resolution having regard to the shift information obtained on the basis of the pairs of first and second windows.

According to another embodiment, the processing means comprise a multiplication block or means configured to multiply by a coefficient the shift information obtained before the multiplexing of the first and second view. According to another aspect, there is provided an appliance, for example a 3D television or a digital television decoder comprising a system for processing a multiplex such as described above.

BRIEF DESCRIPTION OF THE DRAWINGS

Other advantages and characteristics of the present disclosure may be apparent on examining the detailed description of non-limiting modes of implementation and embodiments and the appended drawings in which.

DETAILED DESCRIPTION OF THE PREFERRED EMBODIMENTS

The multiplexing which is particularly described hereinafter is that known by the name "line interleave". However, the principles described below apply to any format, using the multiplexing of two spatially sub-sampled stereoscopic views. Thus, the HDMI standard defines the following sub-sampling grids: Line interleave (vertical sub-sampling); Column interleave (horizontal sub-sampling); and Pixel interleave (checkerboard sub-sampling grid according to a term well known to the person skilled in the art).

These grids are used during a multiplexing of views in a 3D image. By way of exemplary embodiment, two complementary grids are used, one each view. The grids define for each of the views the pixels which may be preserved and those which may be deleted during the multiplexing. The two sub-sampled views are thus obtained in a single image. For example, in the case of two complementary grids with horizontal lines, a vertical sub-sampling is obtained for which in each of the two views one line out of two is deleted, therefore leading to missing pixels with respect to the original view.

And it is these sub-sampled views which are multiplexed in a 3D image. The multiplexing then includes arranging the remaining pixels in each view in a composite 3D image. In this composite image, the two views are mutually spatially shifted to allow the perception of relief by the observer. The shift may be different for each pixel and the whole set of shifts correspond to parallax information.

Figure 1:
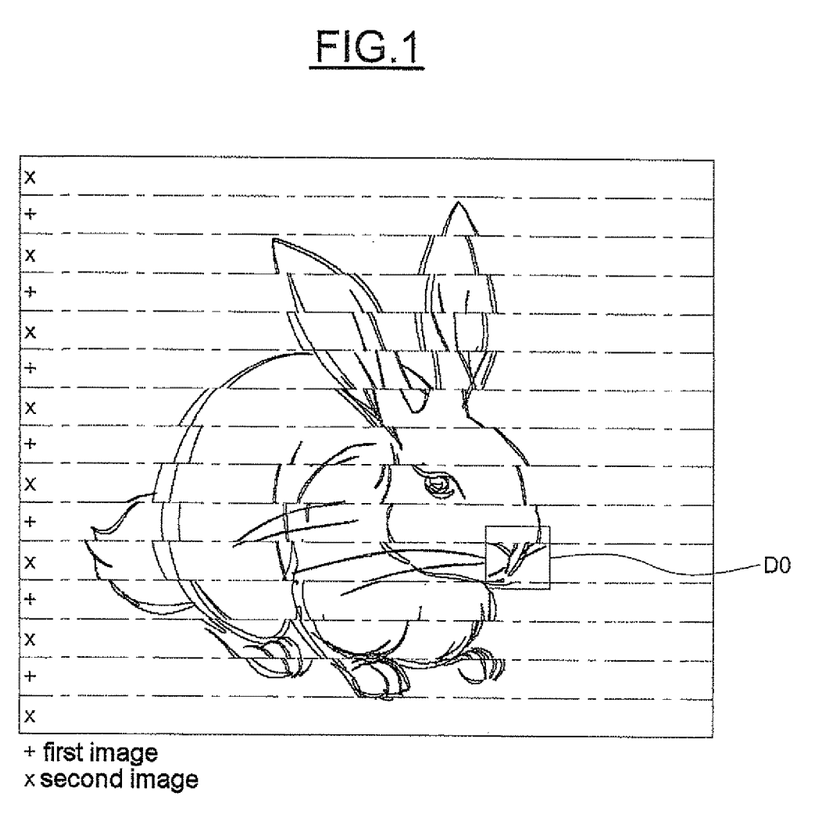
FIG. 1 schematically illustrates an exemplary 3D image resulting from a multiplexing using a sub-sampling.

In FIG. 1, a multiplex image of two views is illustrated. The two multiplexed views are almost identical, they represent one and the same object, for example a rabbit from two different viewpoints. The two views could also be quite simply identical.

The first view is represented in the multiplex on the even lines marked "+" and intended for one eye of the observer, and the second view is represented in the multiplex on the odd lines marked "×" intended for the other eye of the observer. In this diagram for reasons of clarity, the lines include several pixels width-wise, whereas in reality, the lines comprise only a single pixel width-wise.

The lines (×) of the second view are shifted to the left with respect to the lines of the first view (+). This shift is called parallax. It is in general, variable for each of the pixels of the first and the second view. It is directly linked with the depth perceived by the observer. This depth corresponds to the distance between the object point perceived by the observer and the screen on which the observer's eyes focus.

Figure 2:
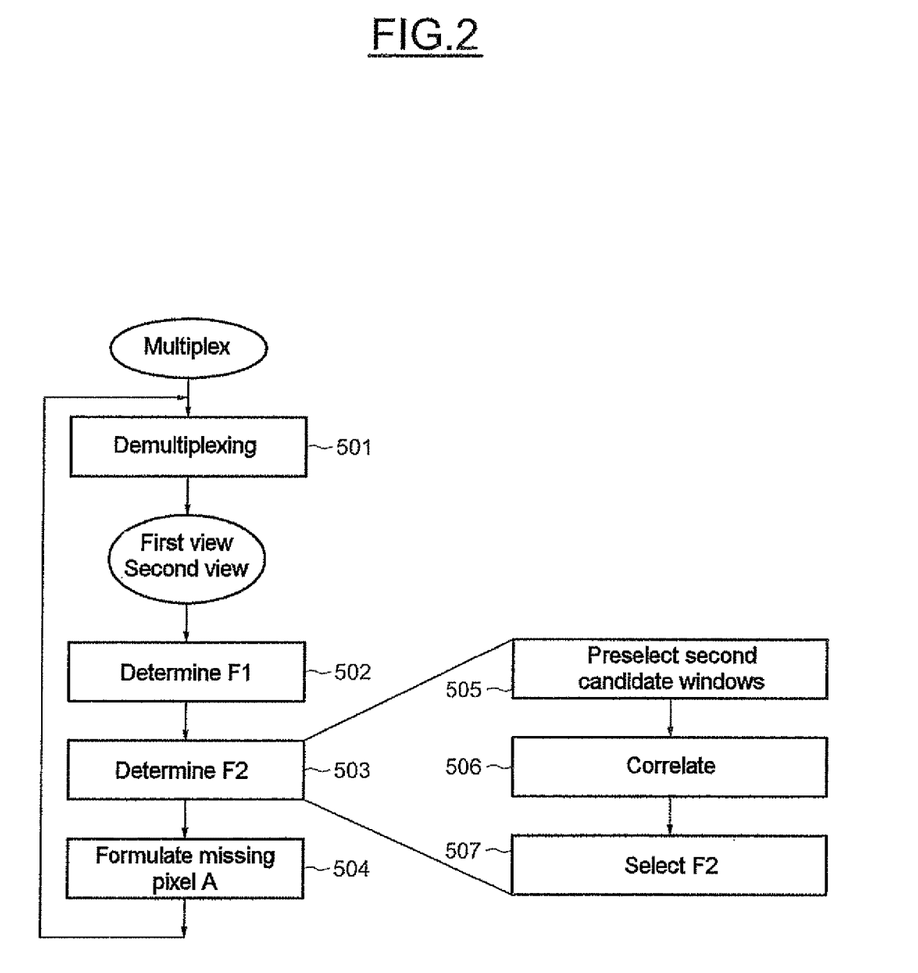
FIGS. 2 to 6 are schematic diagrams illustrating various modes of implementation of a method for increasing resolution of the first view in accordance with present embodiments.
Figure 8:
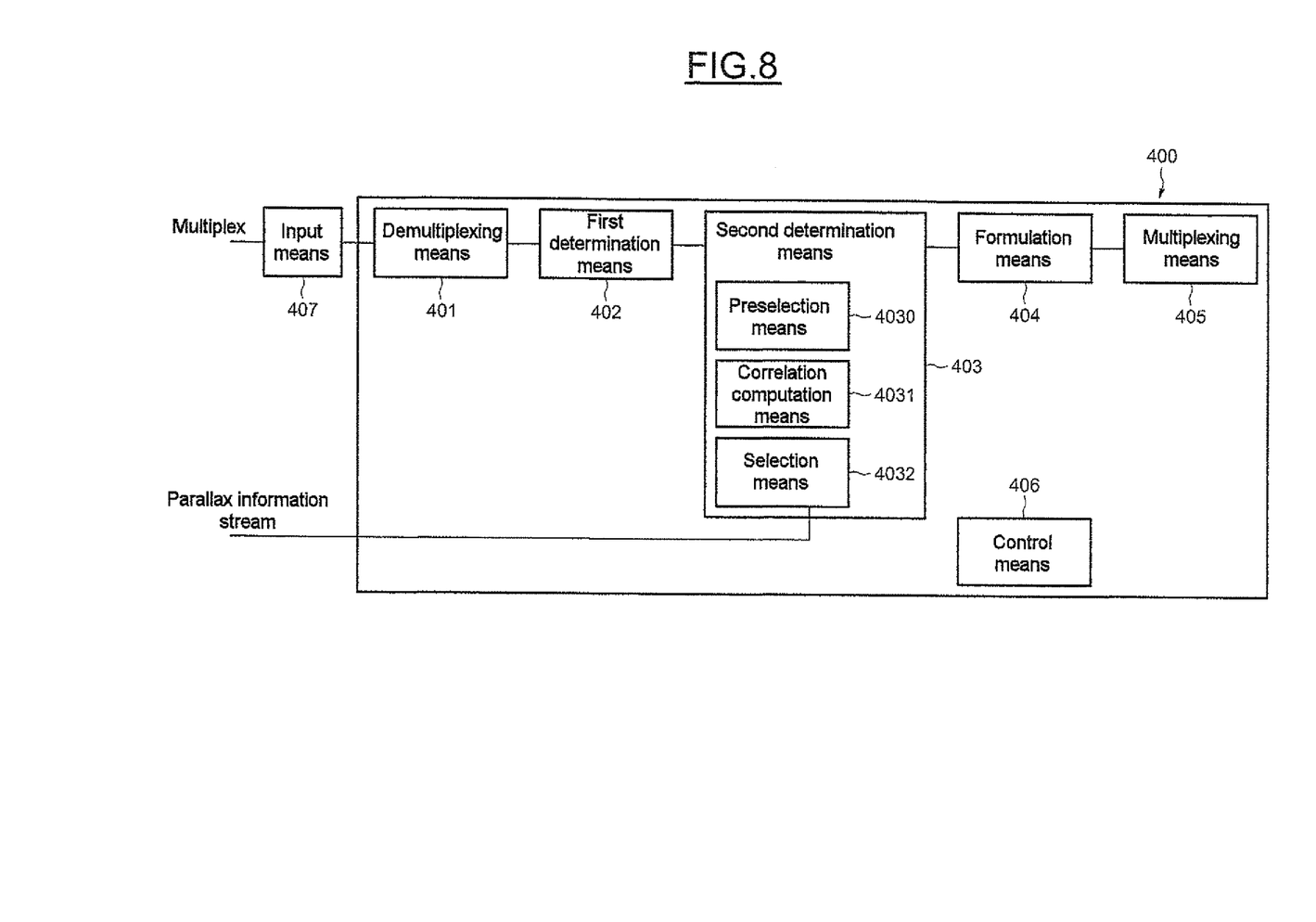
FIG. 8 is a schematic block diagram illustrating an embodiment of a system according to the present disclosure.

In FIG. 2 are illustrated the steps of a method for increasing resolution of the first view according to the present disclosure. Initially (501), the multiplex image is demultiplexed as a function of the type of multiplexing so as to extract the first and the second view. This step is carried out by a demultiplexing block or means 401 (FIG. 8). Thus, first and second sub-sampled views are obtained on the basis of the 3D image.

Figure 3:
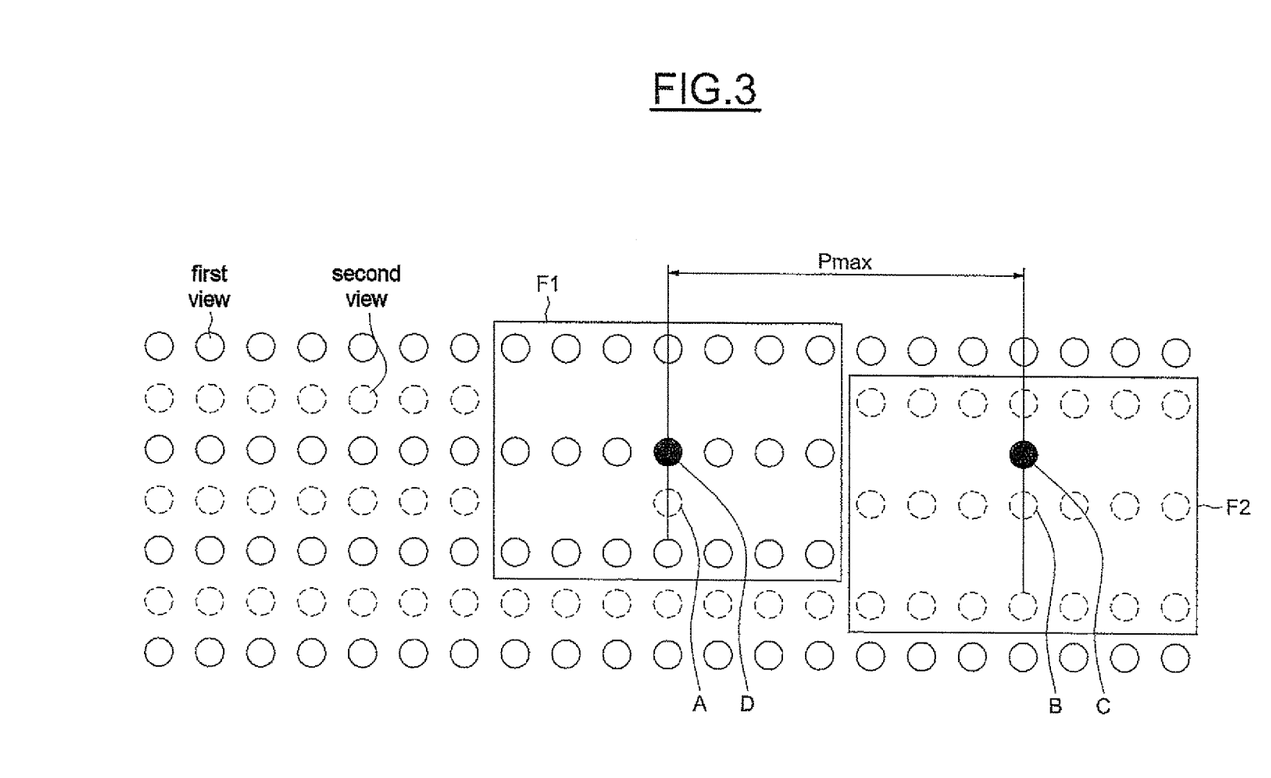

This sub-sampling results, for example as illustrated in FIG. 3, in the omission of one line of pixels out of two in each of the two views. This figure is also referred to hereinafter in the text.

Next, a first window F1 containing the position of the missing pixel is determined (502) in the first view. The size of the window F1 is fixed, for example 7×3 pixels. This step is carried out by first determination block or means 402 (FIG. 8). This pixel A whose position is illustrated in FIG. 3 is a pixel belonging to the first original view and which on account of the sub-sampling is missing from the first view.

Next, a second determination block or means (403, FIG. 8) undertakes the determination (503) of a second window F2 in the second view. This second window F2 is associated with the first window in the sense that it represents the same detail as the first window in the second view, for example the detail D0 (FIG. 1).

As may be seen in FIG. 3, the window F2 is shifted by a shift value Pmax. Since the two windows represent the same detail in each view, the shift Pmax corresponds substantially to the local parallax (for this detail) between the two views. And if a shift of the value of this shift Pmax were applied to the pixels of the odd line of the detail D0 (FIG. 1), a transformed detail would then be obtained, from which the discontinuities would be deleted.

Next on the basis of the second window, the missing pixel is formulated (504). For this purpose, a formulation block or means (404, FIG. 8) may, as a function of the pixels of the second window, determine a value for the missing pixel of the first window. This value may then be inserted into the first window. For example the value is taken of the pixel B of the window F2 which is superimposed on the pixel A if the shift Pmax is cancelled. It is also possible to form a weighted sum of the values of several pixels of the window F2 around the pixel B and to insert this pixel value for the pixel A.

In the course of this step (504) the formulation means (404, FIG. 8) can also determine missing values of pixels for the window F2. For this purpose, they use the pixels of the window F1 of the first view. For example, the value of the pixel D of the window F1 may be inserted at the position of the missing pixel C of the window F2, this pixel D being superimposed on the pixel C if the shift Pmax is cancelled. The first and the second modified window are then stored, as is the parallax information of the pixels of the first and of the second window. The storage is for example carried out by the formulation means (404, FIG. 8).

A control block or means (406, FIG. 8) is then able to activate the first and second determination means as well as the formulation means so as to repeat steps 502, 503, 504 on the whole set of missing pixels of the first view so as to increase its resolution. It is possible to increase the resolution of the second view by carrying out all that has just been described on the second view.

According to a variant, in the case where at least one missing pixel has been formulated for each second window, it is possible to use the second stored windows to form a second view without any missing pixel and whose resolution is therefore increased. The step of determining the second window F2 may be carried out in accordance with various modes of implementation.

According to a first mode of implementation also illustrated in FIG. 2, to determine the second window F2, the determination of several second candidate windows in the second view (505) is firstly undertaken. For this purpose, a preselection block or means (4030) preselects the candidate windows of the second view. The correlation computations may thus be carried out only on the preselected windows. This makes it possible to avoid tedious computations on all the windows of the second view. The preselection means determine or recover the position of the missing pixel of the first view and then preselect the whole set of candidate windows contained in a zone of chosen size of the second view containing the position of the missing pixel.

By way of exemplary embodiment, the size of the zone may be chosen in width equal to the vertical width of the window F1. In this case, vertical alignment of the zone may be carried out as a function of the sub-sampling grid. This makes it possible to limit the size of the zone without excluding the windows representing the same detail. For example, in the "Line interleave" case, a zone of the second view whose vertical width is equal to that of the window F1 is determined. This zone contains the position of the missing pixel and is aligned with the line just below the window F1. In this case, it is also possible to limit the horizontal positions of the second candidate windows by arbitrarily fixing a series of several spacings of window to be tested.

More generally, the size of the zone is such that the windows of the second view representing the same detail as the window F1 are not excluded. Thus, the vertical width of the zone may be sufficiently significant and/or the vertical alignment sufficiently precise so that the windows of the second view potentially representing the same detail as the first window are included therein, this being so also in the case of a vertical parallax for example because of poor alignment of the cameras.

Each of the preselected windows is then tested (506) from the viewpoint of its correlation with the first window F1. A computation block or means (4031) compute the correlation of each second preselected window with the first window. Second candidate windows which have several values of shift with the first window are thus tested.

The correlation can by way of an exemplary embodiment be computed by using a computation method called SAD according to an acronym well known to the person skilled in the art for Sum of Absolute Difference which includes calculating the sum of the absolute values of the differences of value of each pixel of a window with the value of the pixel having the same position in the other window. These tests allow a selection from among the candidate windows of the window exhibiting the best correlation with the first window (507). For this purpose, the correlation computations are transmitted to a selection block or means (4032) which selects the window F2 exhibiting the best correlation with the window F1.

Thus, in the case illustrated for the shift value Pmax of the two windows determined, a maximum correlation with the first window is obtained. On the basis of this shift Pmax, a parallax value for the pixels contained in these two windows can be determined: it is equal to the shift value. In the mode of implementation illustrated, the shift is horizontal, it can also be vertical in the case of a vertical parallax.

Figure 4:
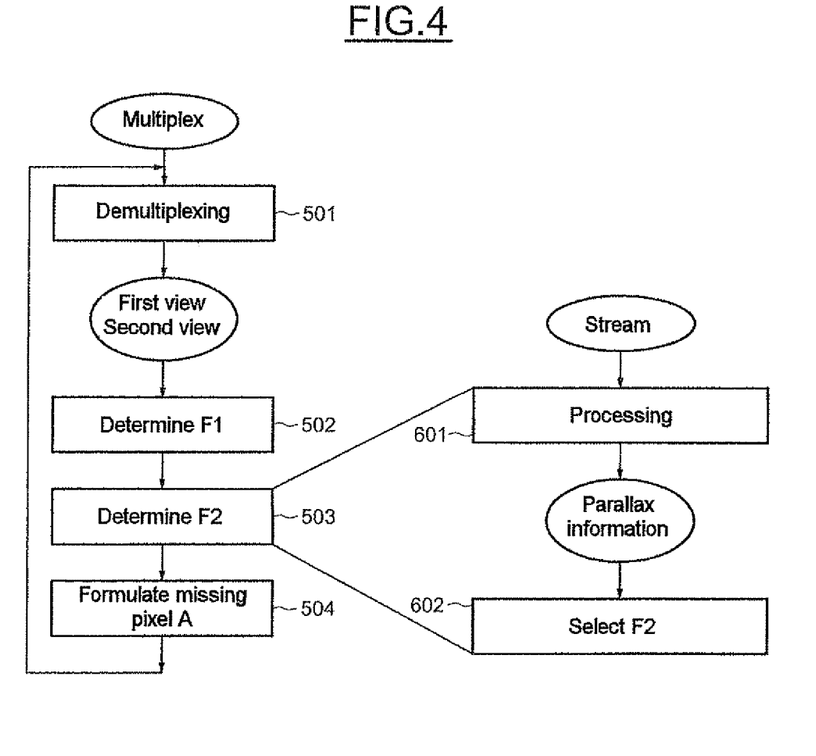

According to a second mode of implementation illustrated in FIG. 4, for the determination of the second window, a stream comprising parallax information associated with the two views is used. The stream contains for example parallax information for each of the pixels present in the first view with respect to the second view.

This information stream is received (601) by the selection means (4032). The stream can have a compressed format according to the H264 standard for example. If appropriate, the stream is processed by the selection means according to a decompression method well known to the person skilled in the art so as to extract therefrom the parallax information. This parallax information can by way of exemplary embodiment be coded in an image whose resolution is less than or equal to the resolution of a view. In this case it may be necessary to decompress the stream and to interpolate the parallax associated with the missing pixel. With this parallax information, the selection means (4032) determines the parallax of the missing pixel of the first view with respect to the second view.

With the aid of this stream, the selection means (4032) selects (602) from among windows included in a zone of chosen size of the second view which contains the position of the missing pixel and whose vertical and horizontal shifts with the first window are the closest to the parallax information of the missing pixel. By way of exemplary embodiment, the selection mentioned hereinabove is carried out from among windows preselected by the preselection means. The selected window is then associated with the first window. Stated otherwise, this stream is used to determine the parallax of the missing pixel. This parallax makes it possible to select the window F2.

The two variants which have been illustrated in FIGS. 2 and 4 may be implemented independently of one another. That said, if the correlation does not allow a satisfactory selection. That is to say if after the correlation computations, several windows have a high correlation value (a high correlation may be defined as a percentage of the maximum correlation) with the window F1 or if no window with a correlation greater than a threshold can be determined. The parallax information stream may be used either to decide between the second candidate windows which have one and the same maximum value, or to determine a second window.

Figure 5:
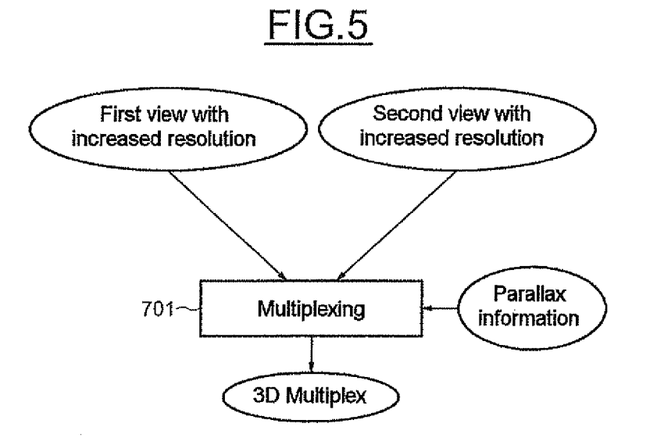
Figure 6:
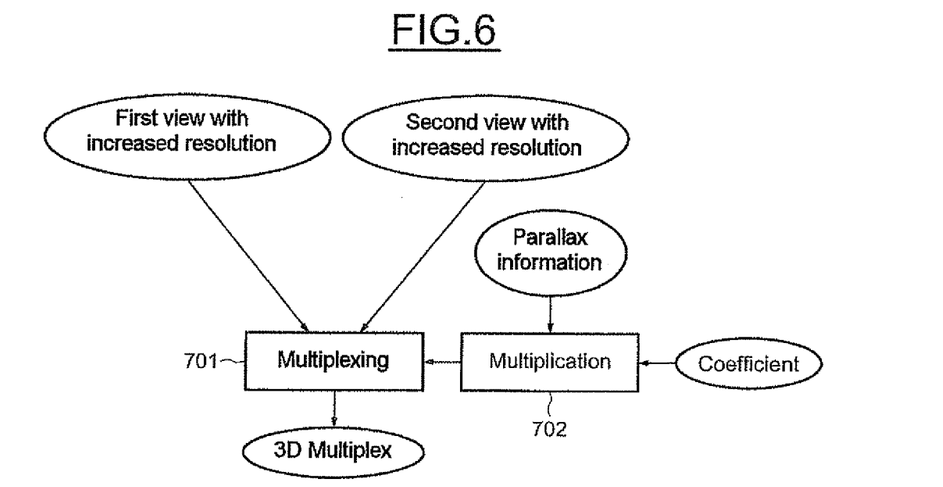

FIGS. 5 and 6 illustrate the multiplexing processing for the views whose resolution has been increased. According to a first mode of implementation (FIG. 5), the two views are multiplexed (701) by the multiplexing means (405, FIG. 8) by taking account for each of the pixels of the parallax information of each of the pairs of windows containing the position of the pixel and stored by the formulation means (404, FIG. 8).

According to a second mode of implementation (FIG. 6), the parallax information is multiplied (702), before the multiplexing, by a coefficient which is fixed or which is transmitted by the observer. The multiplication can, for example, be carried out before the storage of the parallax information by the formulation means (404, FIG. 8). The multiplexing is carried out by the multiplexing means (405, FIG. 8). The latter by virtue of the parallaxes (multiplied or not) of each of the pixels and by virtue of the whole set of pixels of the first and the second view may be able to carry out a multiplexing so as to form a 3D image.

Thus, it is thus possible to obtain a display of a 3D image having not lost any resolution. By way of exemplary embodiment, the multiplexing is carried out temporally in accordance with the "Frame Sequential" format. A spatial or spatio-temporal multiplexing is also possible. In the case of spatial multiplexing, it is possible to use a projector with twice as great a resolution as each of the two views. Thus, a 3D composite image is obtained, in which the resolution of the views is preserved. The multiplexing can include for example arranging each view in a top/bottom composition, or over/under composition according to a term well known to the person skilled in the art. It is also possible in the case of the use of video glasses to project each of the views with the increased resolution for the corresponding eye.

Figure 7:
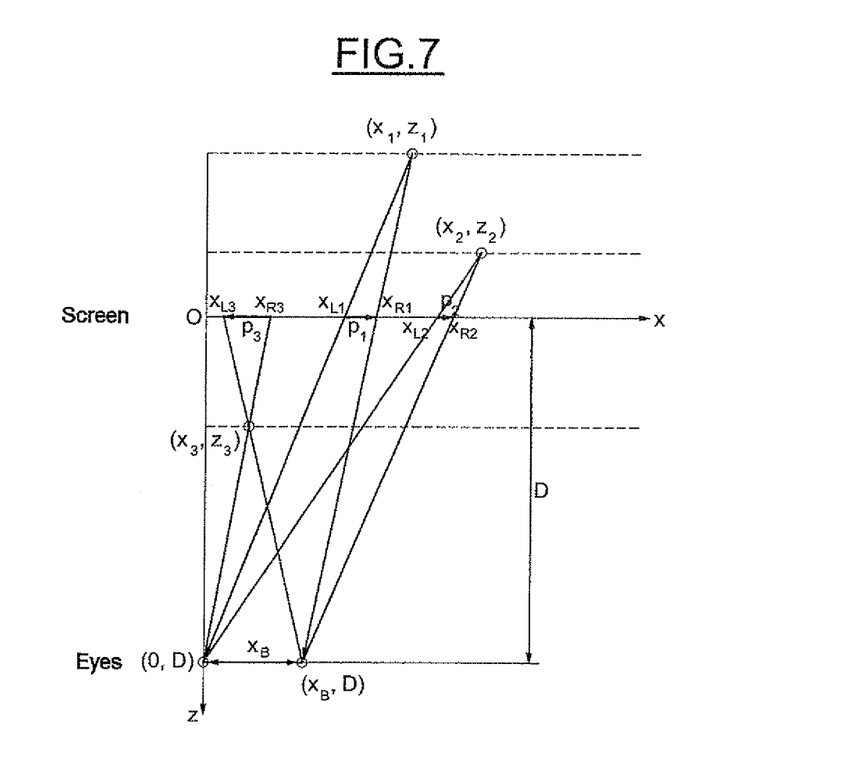
FIG. 7 is a schematic diagram illustrating the principle of the optical formation of a 3D image.

It is also possible, by multiplying the parallax information, to adjust the depth as is indicated below with reference to FIG. 7. In FIG. 7 the principle of the formation of a 3D image is illustrated. Illustrated therein is: a screen; two eyes in position (0,D) and $(x_B, D)$ with $x_B$ the value of the spacing between the two eyes, the axis of the eyes is therefore parallel to the screen and spaced a value D from this screen; three points whose coordinates perceived by the observer are $(x_1, z_1)$, $(x_2, z_2)$, $(x_3, z_3)$.

These three points represent three objects of a 3D image. Their projection on the screen is respectively represented by the points $(x_{Li}, x_{Ri})$, the index i taking the values 1, 2 and 3. $x_{Li}$ corresponds to the position of the point of index i on the screen as seen by the left eye and $x_{Ri}$ corresponds to the position of the point of index i on the screen as seen by the right eye.

The observer by observing the pairs of homologous points $(x_{Li}, x_{Ri})$ perceives the position and the depth of the object points $(x_i, z_i)$. It is therefore seen that the parallax $p_i$ corresponding to the spacing between the positions of the homologous points $(x_{Li}, x_{Ri})$ is directly linked with the sensation of depth. The formula describing this is:

$$p_i = x_B \cdot (1 - D/(D - z_i))$$

Thus, by reducing the parallax, the sensation of depth $z_i$ is reduced and conversely, by increasing the parallax, the sensation of depth is increased.

FIG. 8 illustrates a system architecture 400 in which the input block or means 407 is linked to the processing means incorporating the blocks or means 401 402, 403, 404, 406 and the multiplexing block or means 405 mentioned above. At least some of these blocks or means may be implemented in the form of software modules for example in one or more computers.

Figure 9:
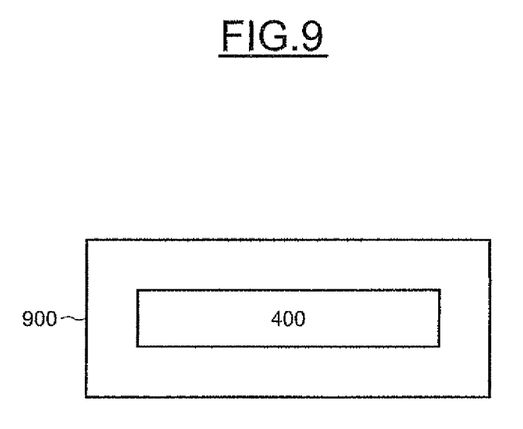
FIG. 9 is a schematic block diagram illustrating an embodiment of an appliance including an exemplary system according to the present disclosure.

FIG. 9 illustrates an exemplary appliance 900 comprising the processing system 400. This appliance may be for example a 3D television or else a digital television decoder which processes data containing video streams, and known as a "set top box". This decoder may be linked to the ADSL (Asymmetric Digital Subscriber Line according to a term well known to the person skilled in the art), to a fiber optic network, to a cable, or may receive DTT (Digital Terrestrial Television).

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

That which is claimed is:

1. A method for processing a multiplex image, the multiplex image comprising at least one first view intended to be viewed by a first eye of an observer and at least one second view intended to be viewed by a second eye of the observer, the two views being spatially sub-sampled according to complementary grids and mutually spatially shifted, the method comprising:

demultiplexing the multiplex image to extract the first view to be observed by the first eye of the observer and the second view to be viewed by the second eye of the observer; and for at least one missing pixel of the first view, as a result of sub-sampling during multiplexing of the multiplex image, a) performing a determination of a first window of the first view containing the location of the missing pixel and representing a first detail in the first view, b) performing a determination of a second window of the second view representing the first detail, of the first window of the first view, in the second view, wherein the second window is shifted by a shift corresponding to a local parallax between the two views associated, with the detail, and c) performing a formulation of the missing pixel of the first view by using the pixels of the second window of the second view to determine a value for the missing pixel of the first window, wherein the value is inserted into the first window.

2. The method according to claim 1, wherein the determination of the second window comprises:

a determination of a plurality candidate windows within the second view, each second candidate window being included in a zone of a chosen, size of the second view, the zone containing a position of the missing pixel;

computations of correlation between the first window and each second candidate window; and a selection of the second candidate window exhibiting a most significant correlation with the first window.

3. The method according to claim 1, wherein the determination of the second window comprises:

a reception of a stream comprising parallax information associated with the two views; and a selection of the second window included in a zone of chosen size of the second view, the zone containing a position of the missing pixel and whose shift with the first window is the closest to the parallax information of the missing pixel.

4. The method according to claim 1, wherein steps a), b) and c) are repeated on each of the pixels of the first view to increase the resolution of the first view.

5. The method according to claim 4, further comprising multiplexing the two views with increased resolution based upon shift information obtained on the basis of pairs of first and second windows.

6. The method according to claim 1, wherein the formulation of a missing pixel in the second window is performed on the basis of the first window associated therewith.

7. The method according to claim 5, wherein the shift information obtained is multiplied by a coefficient before the multiplexing of the first and second views.

8. A system for processing a multiplex image, the multiplex image comprising at least one first view intended to be viewed by a first eye of an observer and at least one second view intended to be viewed by a second eye of the observer, the two views being spatially sub-sampled according to complementary grids and mutually spatially shifted, the system comprising:

an input block configured to receive the multiplex image; and a processing block comprising a demultiplexing block configured to demultiplex the multiplex image to extract the first view to be observed by the first eye of the observer and the second view to be viewed by the second eye of the observer, a first determination block configured to determine a first window of the first view containing the location of a missing pixel of the first view and representing a first detail in the first view, the missing pixel being the result of sub-sampling during multiplexing of the multiplex image, a second determination block configured to determine a second window of the second view representing the first detail, of the first window of the first view, in the second view, wherein the second window is shifted by a shift value corresponding to a local parallax between the two views associated with the detail, a formulation block configured to formulate the missing pixel of the first view by using the pixels of the second window of the second view, to determine a value for the missing pixel of the first window, wherein the value is inserted into the first window, and a control block configured to activate the first and second determination blocks and the formulation block.

9. The system according to claim 8, wherein the second determination block comprises:

a preselection block configured to preselect several second candidate windows within the second view, each second candidate window being included in a zone of chosen size of the second view, the zone containing a position of the missing pixel;

a computation block configured to perform computations of correlation between the first window and each second window; and a selection block configured to select from among the second candidate windows the second window exhibiting the most significant correlation with the first window.

10. The system according to claim 9, wherein the selection block is configured to select, on receipt of a stream comprising parallax information associated with the two views, a second window included in a zone of chosen size of the second view, the zone containing a position of the missing pixel and whose shift with the first window is the closest to the parallax information of the missing pixel.

11. The system according to claim 8, wherein the control block is configured to activate the first and second determination blocks and the formulation blocks for each missing pixel of the first view.

12. The system according to claim 11, wherein the formulation block is configured to formulate a missing pixel in the second window on the basis of the first window associated therewith.

13. The system according to claim 8, wherein the processing block further comprises a multiplexing block configured to multiplex the two views with increased resolution based upon the shift information obtained on the basis of pairs of first and second windows.

14. The system according to claim 13, wherein the processing block comprises a multiplication block configured to multiply by a coefficient the shift information obtained before the multiplexing of the first and second views.

15. An electronic device comprising:

a processing system configured to process a multiplex image, the multiplex image comprising at least one first view intended to be viewed by a first eye of an observer and at least one second view intended to be viewed by a second eye of the observer, the two views being spatially sub-sampled, according to complementary grids and mutually spatially shifted, the processing system comprising an input block configured to receive the multiplex image, and a processing block comprising a demultiplexing block configured to demultiplex the multiplex image to extract the first view to be observed by the first eye of the observer and the second view to be viewed by the second eye of the observer, a first determination block configured to determine a first window of the first view containing the location of a missing pixel of the first view and representing a first detail in the first view, the missing pixel being the result of sub-sampling during multiplexing of the multiplex image, a second determination block configured to determine a second window of the second view representing the first detail, of the first window of the first view, in the second view, wherein the second window is shifted by a shift value corresponding to a local parallax between the two views associated with the detail, a formulation block configured to formulate the missing pixel of the first view by using the pixels of the second window of the second view, to determine a value for the missing pixel of the first window, wherein the value is inserted into the first window, and a control block configured to activate the first and second determination blocks and the formulation block.

16. The electronic device according to claim 15, wherein the second determination block comprises:

a preselection block configured to preselect several second candidate windows within the second view, each second candidate window being included in a zone of chosen size of the second view, the zone containing a position of the missing pixel;

a computation block configured to perform computations of correlation between the first window and each second window; and a selection block configured to select from among the second candidate windows the second window exhibiting the most significant correlation with the first window.

17. The electronic device according to claim 16, wherein the selection block is configured to select, on receipt of a stream comprising parallax information associated with the two views, a second window included in a zone of chosen size of the second view, the zone containing a position of the missing pixel and whose shift with the first window is the closest to the parallax information of the missing pixel.

18. The electronic device according to claim 15, wherein the control block is configured to activate the first and second determination blocks and the formulation blocks for each missing pixel of the first view.

* * * * *